Patented June 25, 1929.

1,718,335

UNITED STATES PATENT OFFICE.

ORVILLE ELLSWORTH CUSHMAN AND THEODORE WILLIAM DOELL, OF BERKELEY, CALIFORNIA, ASSIGNORS, BY MESNE ASSIGNMENTS, TO STANDARD OIL COMPANY OF CALIFORNIA, OF SAN FRANCISCO, CALIFORNIA, A CORPORATION OF DELAWARE.

SOAPS FROM SULPHONATED MINERAL-OIL ACID SLUDGE AND METHOD OF MAKING SAME.

No Drawing.   Application filed July 28, 1923.   Serial No. 654,486.

This invention relates to a deemulsifying agent and process for preparing the same, which deemulsifying agent is suitable for preventing or breaking emulsions during the treatment of mineral oils, and refers particularly to the preparation of deemulsifying agents from the acid sludge obtained from the treatment of mineral oils with sulphuric acid.

Hitherto, certain acid sludges which have been derived from the treatment of mineral oils with sulphuric acid have been neutralized to produce so-called "soaps" which have been used as deemulsifying agents for treating mineral oils. However, such soaps or deemulsifying agents as have been heretofore prepared have had a high content of objectionable tarry matter, a high content of sulphates and other impurities or diluting materials, and a low content of desired soaps or sulphonates which form the effective agents in breaking emulsions in the treatment of mineral oils. Moreover, such deemulsifying agents impart a dark reddish color to the oils treated and it has been generally impractical to use such deemulsifying agents in the treatment or preparation of such oils as lubricating oils when the oils are required to meet a high color standard.

We have discovered that the content of those desired reaction products or sulphonates, which are useful in the treatment of mineral oils, may be materially increased in the soap or deemulsifying agent by proper selection of the acid sludge from which is obtained the deemulsifying agent.

The sludge obtained from the treatment of mineral oils with relatively weak sulphuric acids such as are below 97% in strength has been found to be relatively low in sulphonate products useful for treatment of mineral oils and to be relatively high in tarry matter and other undesired impurities and diluting materials. Apparently the weaker acid acts upon certain bodies in the oil to polymerize the same rather than unite with such bodies to form sulphonated products and these polymerized products are unsuitable for production of a deemulsifying agent and dilute the deemulsifying agent; whereas, when mineral oil is treated with concentrated or fuming sulphuric acid, that is, acids preferably containing 97% or more $H_2SO_4$ such acid combines with certain constituents of the oil to form sulphonated products which are suitable for the production of the deemulsifying agent. Moreover, the acid sludge, derived from the treatment of relatively viscous or lubricating fractions of petroleum with such 97% or fuming acid, is found to be better suited for the preparation of the deemulsifying agent than the acid sludge derived from treatment of relatively less viscous fractions of petroleum.

It has further been found that, if certain constituents of such fraction of petroleum are first removed by a preliminary treatment or treatments of the fraction with sulphuric acid before the fraction is treated with the preferred 97% or fuming sulphuric acid to form the sludge used in preparing the deemulsifying agent, the resultant sludge from such latter treatment will be more nearly free from impurities, such as tar and coloring matter, than the sludge which can be obtained by directly treating such fractions with the concentrated or fuming sulphuric acid.

We have also discovered that the coloring of the oils generally encountered when treating the same with such deemulsifying agents is due to certain oil-soluble coloring bodies in the deemulsifying agent, which coloring bodies may be removed by treatment of the deemulsifying agent with a suitable solvent for the coloring bodies and, by such treatment of the deemulsifying agent with the solvent, a deemulsifying agent may be prepared which will impart substantially no color to the oils treated therewith.

The objects and advantages of our invention will appear from the description of a preferred process embodying the invention. The invention is not necessarily limited to the preferred process which is given merely as an example.

For preparing the deemulsifying agent, it is preferable to first treat a relatively viscous or lubricating fraction of petroleum with a quantity of sulphuric acid (for example, one-half pound of acid per gallon of oil treated) to remove a part of those constituents which polymerize on the addition of acid, or otherwise form tarry matter or products in the sludge which tarry matter or products are unsuited for use in preparing the deemulsifying agent. As an example, I prefer to employ as the initial oil for the process a distillate from a California or naphthenic base crude, which distillate has a Baumé gravity of 19° and a viscosity of 600 sec. Saybolt at 100° F. The sulphuric acid employed in this preliminary treatment is generally under 97 per cent in strength and I usually empoly sulphuric acid of 66° Baumé strength, although the employment of stronger acids, even those over 97 per cent in strength will not necessarily interfere with the preparation of the proper deemulsifying agent. The time of the preliminary acid treatment with the half pound of 66° Baumé sulphuric acid may be from 20 minutes to an hour. The treatment is conducted upon the cold oil except as the temperature is raised by the heat of reaction. These constituents may be removed with a single application of sulphuric acid to the oil stock or by a number of treatments of the oil with sulphuric acid depending upon the amount of such constituents in the oil, or such preliminary treatment may be limited to removing only a portion of those undesired constituents due to the cost of frequent applications of acid to the oil. It is understood that inasmuch as this preliminary sulphuric acid treatment is for the purpose of eliminating from the oil certain constituents not desired in the sludge to be used in the preparation of the deemulsifying agent, that the sludge produced from this preliminary treatment should be removed from the oil before the application of the concentrated or fuming sulphuric acid, as hereinafter described. This sludge derived from the preliminary treatment of the oil may be separated therefrom in any usual or customary manner of separating from a liquid a plastic solid which is not dissolved therein. Preferably, the separation should follow the general practice of letting the oil and sludge admixture stand until the sludge settles out, which generally requires from 6 to 24 hours, after which the sludge should be withdrawn from the bottom of the container holding the admixture. After such a preliminary treatment of the oil, the oil is then treated with a fuming acid or acid containing 97% or more $H_2SO_4$ and the sludge produced from this treatment selected for the preparation of the deemulsifying agent. Acid as low as 97% in strength may be used in this preferred process, but it is preferable to use relatively stronger acids such as the fuming sulphuric acids. The acid is usually applied in proportions between one-fourth pound and three-fourths pound of sulphuric acid per gallon of oil treated. The acid and oil are agitated together in any suitable manner until the resultant reaction is completed, the reaction being complete in from twenty minutes to an hour, and then the admixture being permitted to settle and the sludge and acid separated.

The acid sludge from this treatment contains the desired sulphonic acids in solution in a quantity of free sulphuric acid. To separate the sulphonic acids from the sulphuric acid, the sludge is then diluted with water, which causes uncombined sulphuric acid to separate out as a lower layer and the sulphonic acids and certain reaction products to rise to the top in the form of a tarry mass. The dilution of acid sludge should be such that the layer containing the uncombined sulphuric acid thereafter separated will contain from 50% to 55% of sulphuric acid, at which concentration it is found that the most complete separation of the sulphonic acids from the sulphuric acid occurs. During the separation of the sulphonic acids from the sulphuric acid the mass should be brought to a temperature of about 220° F. This temperature may be produced by the heat of reaction between the acid sludge and diluting water or it may be necessary to apply additional heat to attain this temperature. The dilution water should be thoroughly mixed with the sludge—for which purpose either air, steam or mechanical agitations may be used—after which it is preferable to allow the mass to stand until cool before separating the constituents.

The sulphuric acid may be separated from the upper layer containing the sulphonic acids in any preferred manner such as drawing off the sulphuric acid layer. By employing the correct dilution and temperature before specified, the upper layer contains practically all the sulphonic acids of the acid sludge in a form nearly free from sulphuric acid. The separated sulphonic acids and the other reaction products in this upper layer are then neutralized by treating the sulphonic acids with a slight excess of caustic soda. The strength of the caustic soda should not be materially over 20° Bé. as a stronger caustic solution has a tendency to surround or cover the particles comprising the semi-solid mass of sulphonic acid with a layer of neutralized sulphonates, which may prevent the particles from becoming dissolved and neutralized with the caustic soda.

The resultant soap solution is then ready for the treatment used to remove the oil-soluble coloring matter. For this treatment, the soap solution should be brought to a concentration of about 9% to 12% of solids. Thereafter, the solution is agitated with one or more washes of a solvent of the coloring matter. For this solvent, benzol is found especially suitable. The solvent is preferably applied to the soap solution in a number of relatively small applications, that is from 20% to 25% by volume of benzol is added to each volume of soap solution treated so that efficient use of the solvent is attained. Approximately four of such washes of benzol are found sufficient to substantially free the deemulsifying agent from the oil soluble coloring matter. If the soap solution is not brought to the preferred concentration of solids prior to the application of the benzol wash or washes persistent emulsions may be formed which will tend to prevent the removal of the color bodies and the desired purification of the soap. When the preferred concentration of soap solution is used a clean and rapid separation of the benzol layer and soap solution takes place. The benzol may be recovered from each wash by redistillation and used again in the process.

After the removal of the oil soluble coloring matter with the solvent, the soap solution is then preferably concentrated to a strength of between 18% and 22% of solids at which concentration it has been found to be most effective for the treatment of mineral oils, particularly in the treatment of lubricating oils.

While we have described a preferred method of preparing the deemulsifying agent, it is not intended to limit the invention to the preferred process or preferred deemulsifying agent as various modifications may be made within the spirit of the invention. This invention is of the scope set forth in the accompanying claims.

We claim:

1. A process of producing a deemulsifying agent which includes treating a mineral oil with sulphuric acid, separating the sludge from the oil, then treating the oil with sulphuric acid having a strength greater than 97%, separating the sludge from the oil, separating the sulphonated products of said second sludge from the free sulphuric acid therein, neutralizing the sulphonated products, and extracting the oil soluble coloring matter from the latter with benzol.

2. A process of producing a deemulsifying agent which comprises treating a lubricating fraction of mineral oil with sulphuric acid, removing readily polymerizable material, then treating the mineral oil with concentrated sulphuric acid, separating the acid sludge from the oil stock, separating the sulphonated products of such sludge from the free sulphuric acid therein, neutralizing the sulphonated products, and extracting therefrom the oil soluble coloring matter with benzol.

3. In a process of preparing a deemulsifying agent, the steps comprising first treating a lubricating fraction of mineral oil with sulphuric acid, and separating from the oil and discarding the sludge thus produced, thereafter treating the oil with sulphuric acid above 97 per cent in strength, separating the sludge thus produced from the oil, separating this sludge into a sulphonic acid layer and a sulphuric acid layer, neutralizing the sulphonic acid solution layer, bringing this solution to a concentration substantially between 9 and 12 per cent of solids, then removing the oil soluble coloring matter with benzol, and concentrating the benzol purified solution to between 18 and 22 per cent of solids.

4. A process as in claim 3 in which the preliminary acid treatment is with sulphuric acid less than 97 per cent strength.

5. A process of making deemulsifying agents from a sulphonated mineral oil sludge comprising, removing the oil from the sludge, agitating the sludge with water at an elevated temperature, separating the mixture and discarding sulphuric acid solution, neutralizing remaining sulphonic acids with an alkali solution, concentrating such neutralized sulphonic acid solution so as to contain 9 to 12 percent solids, and treating such concentrated solution with benzol to remove coloring matter.

6. A process as in claim 5 in which the sulphonated mineral oil sludge is obtained by treating a mineral oil from which the first acid sludge is separated, with sulphuric acid, and discarding the oil.

7. A process of making deemulsifying agents, comprising preliminarily treating a mineral oil with sulphuric acid, separating from the oil and discarding the sludge thus produced, treating the separated oil with sulphuric acid of over 97% strength, separating the oil from the resulting sulphonic and sulphuric acid sludge, then separating sulphuric acid from said acid sludge by treating the sludge with water so as to dilute the sulphuric acid to about 50 to 55% $H_2SO_4$, and gravitationally separating such acid from the sulphonic acid, then neutralizing the sulphonic acids and treating the neutralized sulphonic acids with benzol to remove coloring matter therefrom.

8. In a process of preparing a deemulsifying agent from mineral oils, the step of treating unemulsified sulphonic soaps with benzol to remove coloring matter therefrom.

9. A process of preparing a deemulsifying agent comprising, neutralizing a sulphonated mineral oil sludge, and then treating the soap thus produced with a solvent of the oil soluble coloring matter.

10. A process of preparing a deemulsifying agent comprising, neutralizing a sulphonated mineral oil sludge, and then treating the soap thus produced with benzol to remove the oil soluble coloring matter.

11. A process of preparing a deemulsifying agent comprising, diluting a sulphonated mineral oil sludge with water to separate sulphonic acids therein from the free sulphuric acid, neutralizing the sulphonic acid, and then treating the neutralized sulphonic acids with a solvent of the oil soluble coloring matter.

12. A process of preparing a deemulsifying agent comprising, diluting a sulphonated mineral oil sludge with water to separate sulphonic acids therein from the free sulphuric acids, neutralizing the sulphonic acids, and treating the neutralized sulphonic acids with benzol to remove the oil soluble coloring matter.

13. A process of preparing a deemulsifying agent comprising, diluting a sulphonated mineral oil sludge with water to separate sulphonic acids therein from the free sulphuric acid, neutralizing the sulphonic acids, bringing the neutralized sulphonic acids to a concentration between substantially 9% to 12% of solids, and treating the neutralized sulphonic acid solution with benzol to remove the oil soluble coloring matter.

14. A process of producing a deemulsifying agent comprising, separately removing uncombined oil, free sulphuric acid and sulphonated products from a sulphonated mineral oil, neutralizing the sulphonated products, concentrating the neutralized products, and extracting oil soluble coloring matter therefrom with benzol.

15. A process of producing a deemulsifying agent comprising, separately removing uncombined oil, free sulphuric acid and sulphonated products from a sulphonated lubricating fraction of mineral oil sludge, neutralizing the sulphonated products, bringing the neutralized products to a concentration substantially between 9% and 12% of solids, then treating the neutralized products with a solvent of the oil soluble coloring matter, and concentrating the remaining solution to between 18% and 22% of solids.

Signed at Richmond, Calif., this 20th day of July, 1923.

ORVILLE ELLSWORTH CUSHMAN.
THEODORE WILLIAM DOELL.